(12) United States Patent
Morimoto

(10) Patent No.: US 9,976,586 B2
(45) Date of Patent: May 22, 2018

(54) MODULAR FURNITURE ARRANGEMENT

(71) Applicant: ABSOLUTE MODULE OY, Renko (FI)

(72) Inventor: Teppei Morimoto, Kerava (FI)

(73) Assignee: ABSOLUTE MODULE OY, Renko (FI)

( * ) Notice: Subject to any disclaimer, the term of this patent is extended or adjusted under 35 U.S.C. 154(b) by 0 days. days.

(21) Appl. No.: 15/444,974

(22) Filed: Feb. 28, 2017

(65) Prior Publication Data

US 2017/0234345 A1 Aug. 17, 2017

Related U.S. Application Data

(63) Continuation of application No. PCT/FI2015/050557, filed on Aug. 28, 2015.

(30) Foreign Application Priority Data

Aug. 29, 2014 (FI) ...................................... 20145752

(51) Int. Cl.
*H01R 13/60* (2006.01)
*F16B 12/00* (2006.01)
(Continued)

(52) U.S. Cl.
CPC ............... *F16B 12/00* (2013.01); *A47B 3/06* (2013.01); *A47B 21/06* (2013.01); *A47D 7/005* (2013.01);
(Continued)

(58) Field of Classification Search
CPC ..... A47B 2021/066; A47B 21/06; A47B 3/06; H01R 33/92; A47D 15/00; A47D 7/005; F16B 12/00
(Continued)

(56) References Cited

U.S. PATENT DOCUMENTS 5,282,341 A * 2/1994 Baloga ................. A47B 83/001 49/41
5,651,219 A * 7/1997 Baloga ................. A47B 83/001 52/32
(Continued)

FOREIGN PATENT DOCUMENTS

DE 39 31 225 A1 4/1991
GB 2 509 092 A 6/2014
WO WO 2014/032807 A1 3/2014

OTHER PUBLICATIONS

International Search Report (PCT/ISA/210) dated Feb. 17, 2016, by the European Patent Office as the International Searching Authority for International Application No. PCT/FI2015/050557.
(Continued)

*Primary Examiner* — Abdullah Riyami
*Assistant Examiner* — Nelson R Burgos-Guntin
(74) *Attorney, Agent, or Firm* — Buchanan Ingersoll & Rooney PC

(57) ABSTRACT

A modular furniture arrangement is disclosed having mechanically and electronically attachable modular furniture elements and an application function module attachable to the modular furniture elements, the application function module being chosen based on an application. Inside the modular furniture elements and application function module is arranged at least two electricity conducting structures electrically isolated from each other, the structures operating between modular furniture elements, and between module function parts and at least one application function module for mechanical fixing and serving as an electricity conductor.

12 Claims, 15 Drawing Sheets

(51) Int. Cl.
*A47B 3/06* (2006.01)
*A47B 21/06* (2006.01)
*A47D 7/00* (2006.01)
*A47D 15/00* (2006.01)
*H01R 33/92* (2006.01)

(52) U.S. Cl.
CPC ............. *A47D 15/00* (2013.01); *H01R 33/92* (2013.01); *A47B 2021/066* (2013.01)

(58) Field of Classification Search
USPC ........................................................ 439/557
See application file for complete search history.

(56) References Cited

U.S. PATENT DOCUMENTS

| | | | | |
|---|---|---|---|---|
| 6,292,830 B1* | 9/2001 | Taylor | ................... | G06N 5/043 709/224 |
| 6,457,874 B1* | 10/2002 | Clapp, Jr. | ............ | G02B 6/4277 385/75 |
| 6,931,795 B1* | 8/2005 | Baloga | ................... | A47B 21/00 52/220.7 |
| 7,223,123 B2* | 5/2007 | Brooks | ................. | A47B 21/06 439/577 |
| 8,111,022 B2* | 2/2012 | Snijder | ................... | F21S 2/005 315/312 |
| 8,371,894 B1* | 2/2013 | Rosen | ................... | A63H 33/086 446/102 |
| 8,608,513 B2* | 12/2013 | Lee | ......................... | F21V 15/01 439/668 |
| 2005/0007780 A1 | 1/2005 | Feuerborn et al. | | |
| 2014/0224875 A1* | 8/2014 | Slesinger | ............. | H01R 25/142 235/385 |
| 2015/0194758 A1* | 7/2015 | Hur | ........................ | H01R 12/73 439/627 |
| 2015/0251104 A1 | 9/2015 | Lange et al. | | |
| 2015/0270673 A1* | 9/2015 | Lewis, Jr. | ............... | H01R 39/64 439/131 |
| 2016/0031148 A1* | 2/2016 | Hendrickson | ........... | B29C 33/42 264/523 |
| 2016/0134062 A1* | 5/2016 | Wang | ..................... | H01R 31/06 439/620.21 |
| 2016/0190735 A1* | 6/2016 | Zantout | .............. | H01R 13/6205 362/249.02 |
| 2016/0345729 A1* | 12/2016 | Udagawa | ............. | A47B 83/001 |
| 2016/0360598 A1* | 12/2016 | Negatu | .............. | H05B 37/0272 |
| 2016/0369981 A1* | 12/2016 | Emde | ...................... | F21S 6/003 |
| 2017/0163937 A1* | 6/2017 | McNelley | ................ | H04N 7/15 |
| 2017/0181539 A1* | 6/2017 | Linden | ............... | A47B 47/0041 |

OTHER PUBLICATIONS

Written Opinion (PCT/ISA/237) dated Feb. 17, 2016, by the European Patent Office as the International Searching Authority for International Application No. PCT/FI2015/050557.

* cited by examiner

MODULAR FURNITURE ARRANGEMENT

RELATED APPLICATION

This application claims priority as a continuation application under 35 U.S.C. § 120 to PCT/FI2015/050557, which was filed as an International Application on Aug. 28, 2015 designating the U.S., and which claims priority to Finnish Application 20145752 filed in Finland on Aug. 29, 2014. The entire contents of these applications are hereby incorporated by reference in their entireties.

FIELD

The infrastructures of societies use different kind of furniture in many different places such as for example in offices, accommodations, hospitals, schools, production lines, assembly lines and restaurants and as short time furniture entireties for example in exhibitions.

BACKGROUND INFORMATION

Furniture structures used in offices and in accommodations are, for example, independent furniture entireties, which are not connected to computers, phones and other devices functionally, but furniture used only as passive storing places for separate devices. These have not been advanced integration to furniture according to modern versatile technology. This is the reason that wirings have to be built and routed separately in rooms and separately to each device. Known furniture entireties cannot be adapted when use purpose of a room changes. Rather, such furniture must often be totally changed, which can be impractical and not ecological. Often, wirings can create difficulties to furnishings when electrical devices are desired to be located in furniture. Restricting factors include cleaning, outlook of the décor, practicality and the use of planes that are to be empty and hygienic for the work.

SUMMARY

A modular furniture arrangement is disclosed, comprising: module furniture elements attachable at least at three sides mechanically and electronically; an application function module attachable to the modular furniture elements, the application function module being chosen based on an application, wherein inside the modular furniture elements and application function module is arranged, at least two electricity conducting structures electrically isolated from each other, said structures operating between modular furniture elements and between modular furniture elements and at least one application function module serving for mechanical fixing means and serving as an electricity conductor; at least one attachment part for attaching modular furniture elements to form furniture entireties of desired sizes, which attachment part includes at least one feature of material or material combination, which feature can be processed so that modular furniture elements are attachable to each other by at least one of a mechanical and electrical fixing; and electrical connections between the modular furniture elements and the application function module to conduct electricity between the modular furniture element and the application function module.

A method is also disclosed to form modular furniture entireties, comprising: connecting modular furniture elements having at least three mechanically and electronically attaching sides, and an application function module, the application function module being chosen based on an application, wherein inside the modular furniture elements and application function module is arranged, at least two electricity conducting structures electrically isolated from each other, said structures operating between modular furniture elements and between modular furniture elements and at least one application function module for mechanical fixing and serving as an electricity conductor; and attaching the modular furniture elements to form furniture entireties of desired sizes, wherein by changing at least one feature of material or material combination of an attachment part, modular furniture elements are attached to each other by at least one of mechanical and electrical fixing, whereby an electrical connection between a modular furniture element and the application function module is configured to conduct electricity between the modular furniture element and the application function module.

BRIEF DESCRIPTION OF THE DRAWINGS

Other objects and features disclosed herein will be apparent to those skilled in the art upon reading the detailed description in conjunction with the drawings wherein.

DETAILED DESCRIPTION

Figure 1:
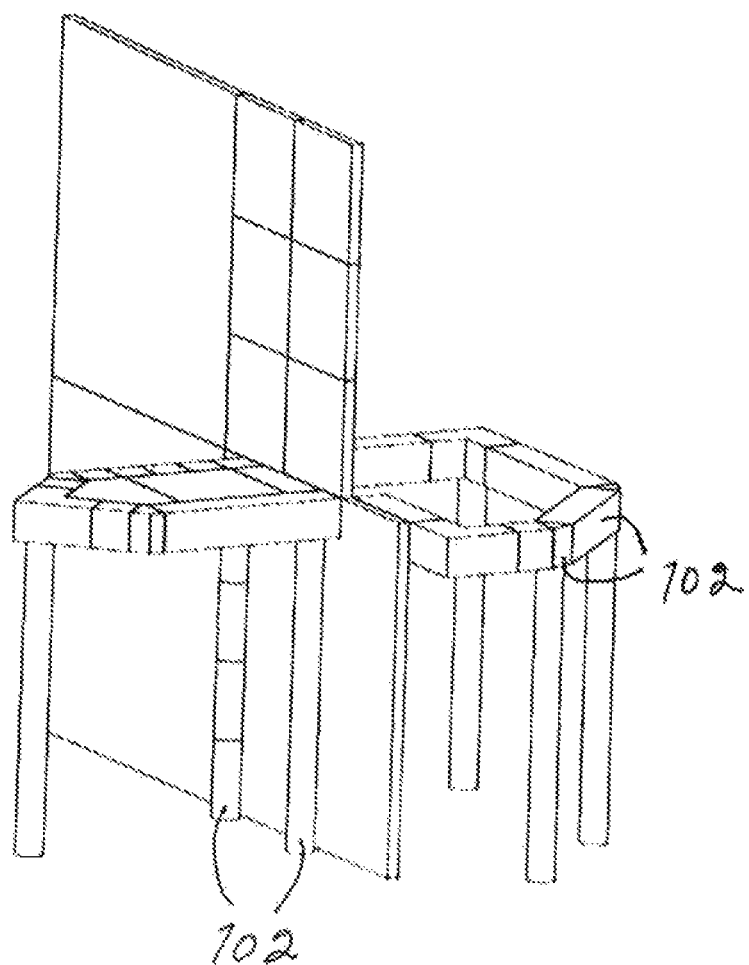
FIG. 1 presents an overview of modular furniture parts attached to each other geometrically, according to an exemplary embodiment disclosed herein.

An integrated modular furniture structure technology as disclosed can enable furniture structures to be adapted to different kinds of applications. This can be achieved by a modular furniture arrangement having at least at three sides mechanically and electronically attachable modular furniture elements and an application function module attachable to the modular furniture elements, the application function module being chosen on the basis of the application. Inside the modular furniture elements and application function module is arranged at least two electricity conducting structures being electrically isolated from each other, the structures operating between modular furniture elements and between modular furniture elements and at least one application function module serving both as mechanical fixing means and an electricity conductor. The modular furniture arrangement can include at least one attachment part for attaching modular furniture elements to form furniture entireties of desired sizes, which attachment part can include at least one feature of material or material combination, which feature can be processed so that modular furniture elements are attachable to each other by at least one of mechanical and electrical fixing method. The modular furniture arrangement can include electrical connections between a modular furniture element and application function module to conduct electricity between the module furniture element and application function module.

A method is disclosed to form modular furniture entireties. The method includes connecting at least at three sides mechanically and electronically attachable modular furniture elements and an application function module, the application function module being chosen on the basis of the application. Inside the modular furniture elements and the application function module is arranged at least two electricity conducting structures being electrically isolated from each other, the structures operating between modular furniture elements and between modular furniture elements and at least one application function module both as a mechanical fixing means and an electricity conductor. Module furniture elements are attached to form furniture entireties of desired sizes, and by changing at least one feature of material or material combination of an attachment part modular furniture elements are attached to each other by at least one of a mechanical and electrical fixing to form electrical connections between the modular furniture element and the application function module to conduct electricity between the modular furniture element and the application function module.

Exemplary embodiments are based on mechanically and electronically attachable modular furniture elements which utilize structures in the attachments of the modular furniture elements, the structures conducting electricity between the modular furniture elements. An application function module can be attached to the modular furniture elements, the application function module being chosen on the basis of the application. Between the modular furniture element and the application function module is at least a electrical connection to conduct electricity between the modular furniture element and the application function module.

Exemplary embodiments can provide active structure entireties which according to the application can be formed from the furniture structures, and device technologies according to the each application can be integrated to the active structure entireties. A need to change physical furniture parts can be minimized when a use purpose of the rooms and furniture structures is changed, and cablings needed to control devices and to feed-in use voltage can be minimized.

Intelligent and modular furniture according to the present disclosure can be used, for example, in homes, offices, exhibitions and restaurants. Forming of modular furniture application to be of a desired size and outlook can be done without tools, screws or glue. Modular furniture elements can include (e.g., consist of) six sided elements having different kind of sizes and shapes and, if desired or necessary, of at least five sided corner pieces of furniture. Modular furniture elements are different sized and shaped entities duplicable, for example, into six different directions. In addition, the rods and the different types of panels can be attached to the furniture structures. They can be disassembled and assembled into desired entireties.

A useful solution disclosed herein is also the fact that each of the modular elements of the furniture structure can be electrically connected to each other, and an electrical network can be formed into the structure of the furniture entirety. The electrical network and the fixing mechanism can be arranged as a single component entity. In different parts of the furniture structure can be placed a variety of application function modules (e.g., device components), which are powered from the electrical network of the furniture. Data transfer can take place wirelessly, so that, for example, smartphones and laptop computers can effortlessly control the furniture structure. In demanding contained conditions, such as a hospital, control or data transfer does not allow for errors, which the wireless connection may cause, and thus data can be transferred in a wire, which can be lined between the module and the surface structure, for example due to its flat shape characteristics. Possible application function modules (e.g., device components) are for example computers, tablets, wireless charger, sound equipment, lightings and burglar alarms.

FIG. 1 illustrates that the modular furniture elements 102 can be of different sizes or shapes having exemplary features described in the figures and the description. Modular furniture elements 102 can be connected to each other and assembled to furniture entireties of different sizes and shapes, so that via support and fastening means integrated to their structures they can conduct operating voltage to each modular furniture element 102 of the furniture structure.

Similarly as modular furniture elements 102, application function modules can be of any shape. Application function module characteristics as compared to modular furniture elements can, for example, differ in that the application function modules have in addition to voltage transmission at least one operating function feature, and an application function module can itself contain any device such as a speaker, lamp, transformer, inverter, and/or monitor, and it can be connected to an external control device such as a computer, telephone or luminaire. An application function module can replace one or more modular furniture element.

Figure 2:
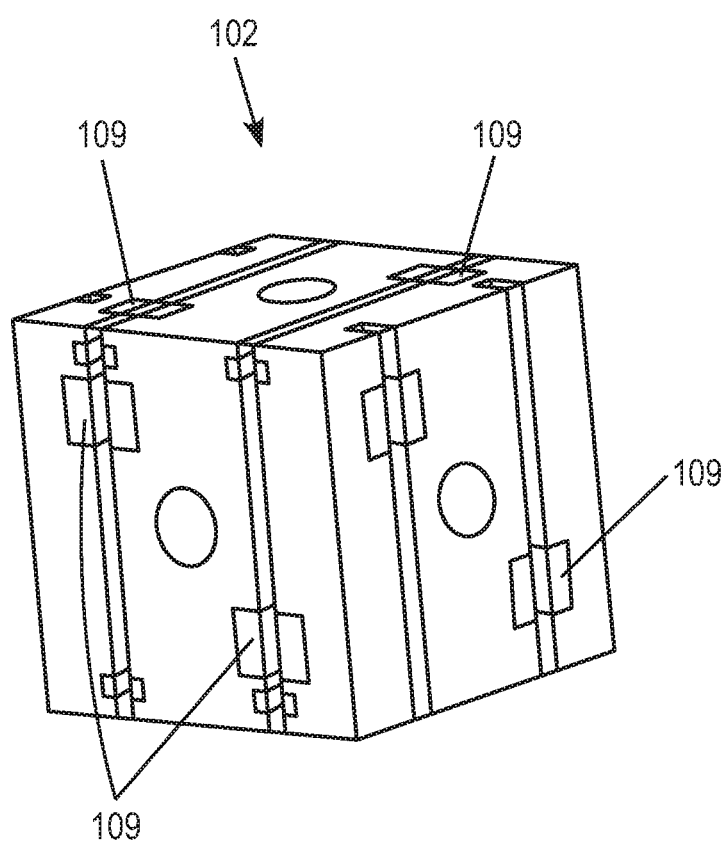
FIG. 2 presents an exemplary six-sided module furniture element as disclosed herein.

FIG. 2 presents a six-sided module furniture element 102, which is reproducible regardless of its size, to six directions to form a furniture entirety of desired size. One or more of modular furniture elements 102 or an application function module 118 can be connected to the modular furniture element 102, or an actuator can be attached directly to the modular furniture element, the actuator being, for example a lamp, a display or a speaker. Mounting ends 109 of symmetrical electrically conductive support and fixing elements have been accomplished to the at least six sides of the modular furniture element enabling duplication of the module furniture elements in any direction to form the desired furniture entirety.

Figure 3A:
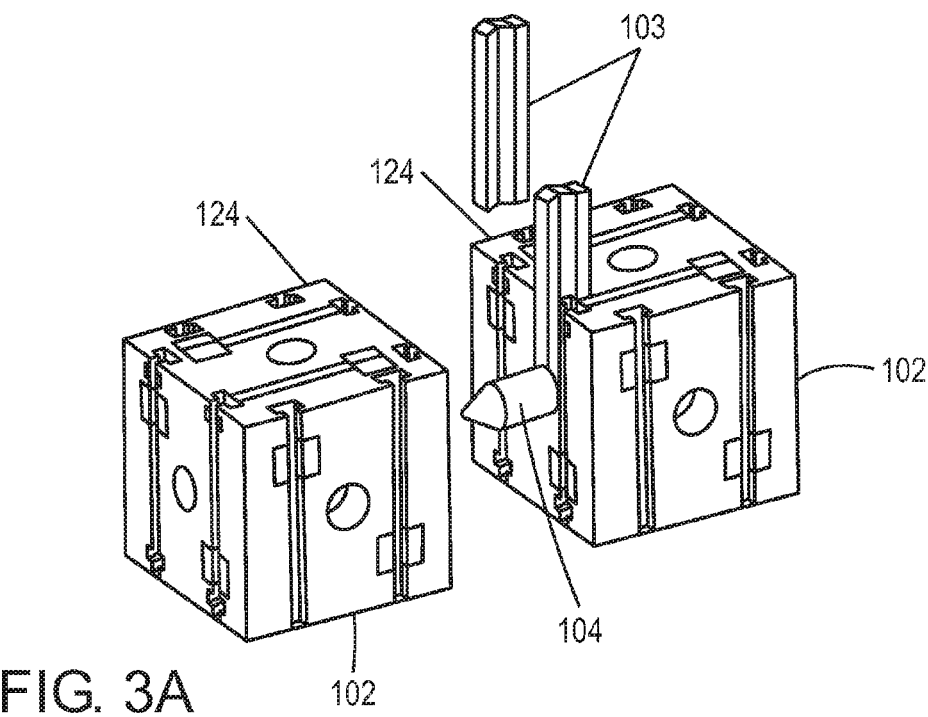
FIG. 3A presents structural parts and fastening means of the modular furniture parts according to the invention.

FIG. 3A presents a fixing mechanism between modular furniture elements 102 or between the application function module and the modular furniture element. Modular furniture elements of at least five sides fit to one another by a conic pivot 104 which is used as an attachment part, so that the sides of the modular furniture elements are positioned against each other via a slide part which is used as an attachment part by pushing the slide part 103 to the mounting groove 124 of the modular furniture element. The sliding part's feature can be a conical shape and the modular furniture elements 102 are fixed to each other by pushing them through said conical shape against each other, as well as, where appropriate, the sliding parts can be used to conduct electricity between modular furniture parts or to the application function module.

Figure 3B:
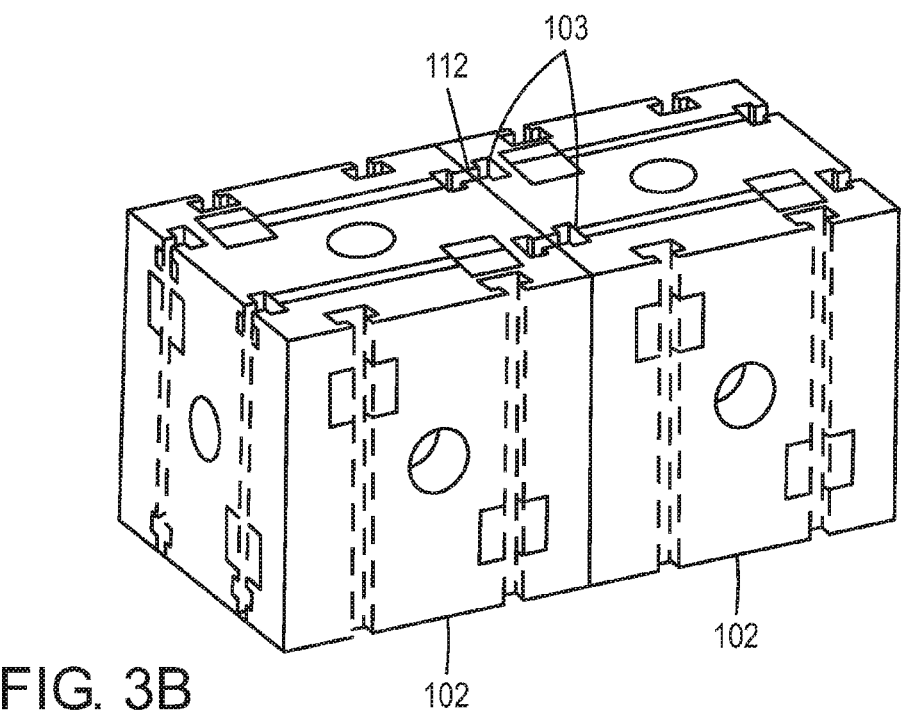
FIG. 3B presents structural parts and fastening means connected to each other of the modular furniture parts according to an exemplary embodiment disclosed herein.

FIG. 3B presents sliding parts 103 locking two modular furniture elements 102 to each other.

Figure 4:
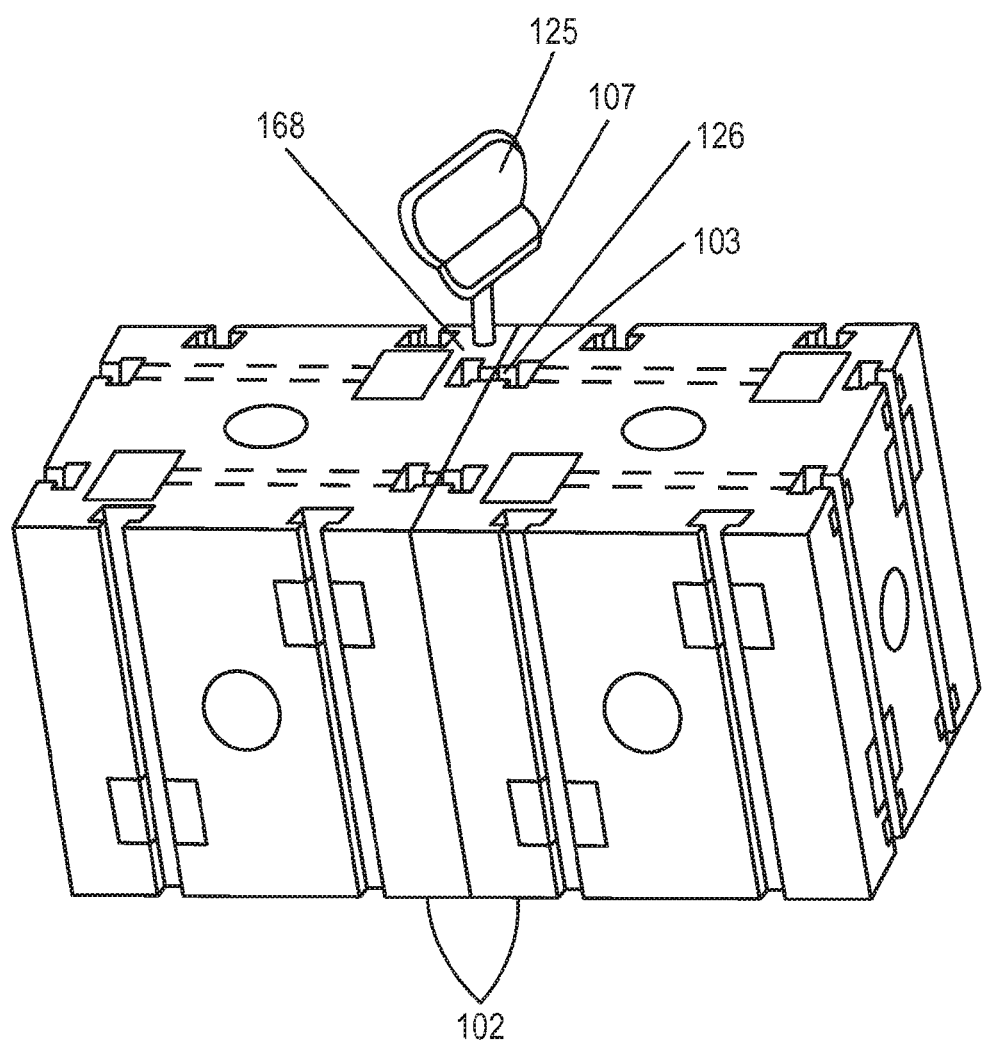
FIG. 4 presents an embodiment according to exemplary embodiments, in which a coupling part is locked or released by a tool.

FIG. 4 presents an embodiment in which in locking or releasing of the sliding part a tool 125 is used. A threaded hole 126 is formed to the sliding part 103 in its sliding direction, and into the hole the tool 125 is threaded from the opposite side of the sliding direction, wherein the tool 125 rotates to the threads of the sliding part 103 and by more turning the planar surface 107 of the tool attaches to the surface 168 of the module furniture element, so that the tool starts to pull the slide part inward, which causes compression of the modular furniture elements against each other or compression of the modular furniture element against the application function module, and from the opposite direction by using the tool the sliding block can be released from the fixing condition.

In an exemplary embodiment, the modular furniture elements 102 are identical on all sides, and their attachment to each other is carried out by a conical shaped mount of the sliding part 103, which can be tightened to fixed possible extra space between the modular furniture elements. By means of the conical shaped sliding part 103, an electrical connection as disclosed herein can be formed between the modular furniture elements. An exemplary embodiment can be configured such that in some direction material of the attachment part 103 is selected to be not electricity conductive material, making it possible to limit current flow in the furniture structure according to a desired embodiment.

Figure 5:
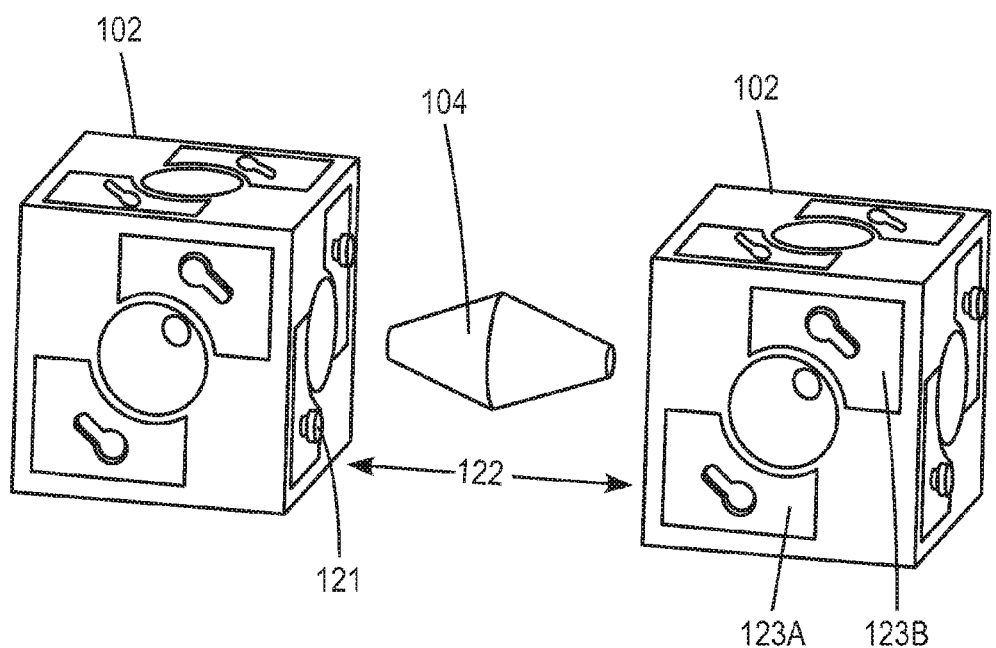
FIG. 5 presents an exemplary embodiment as disclosed herein, in which modular furniture elements or use function modules can be attached to each other by rotation movement.

FIG. 5 presents an embodiment in which the modular furniture elements 102 parts or the application function modules 118 can be attached to each other by rotation. Conic pivot 104 positions and stabilizes the modules and by a double-ended stud 121 two female heads 122 can be combined with each other. Internal structures 123a and 123b of the casting in the figure are electrically conductive and isolated from each other, and are arranged in such a way that they form via at least at two sides an electricity conductive integrated mechanical structure. Furniture modules 102 can be duplicated to one or more directions to form a modular furniture entirety, and at least at one side an application function module can be attached to the modular furniture element.

Figure 6:
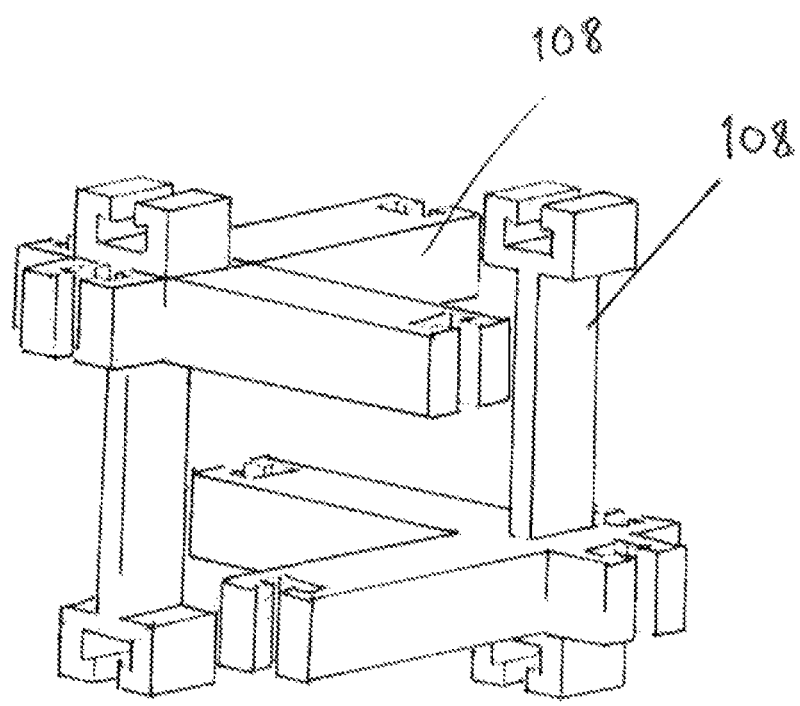
FIG. 6 presents exemplary conducting structures electricity isolated from each other and formed into a casting of a six-sided modular furniture structures.

FIG. 6 presents structures for conducting electricity which are isolated from each other formed into a casting of a six-sided modular furniture element, which leads to at least two sides of at least two mutually isolated electrical conductors, which operate in the furniture structure both as an electricity conductive mechanical fixing structure and as a support structure between the modular furniture elements 102.

Figure 7:
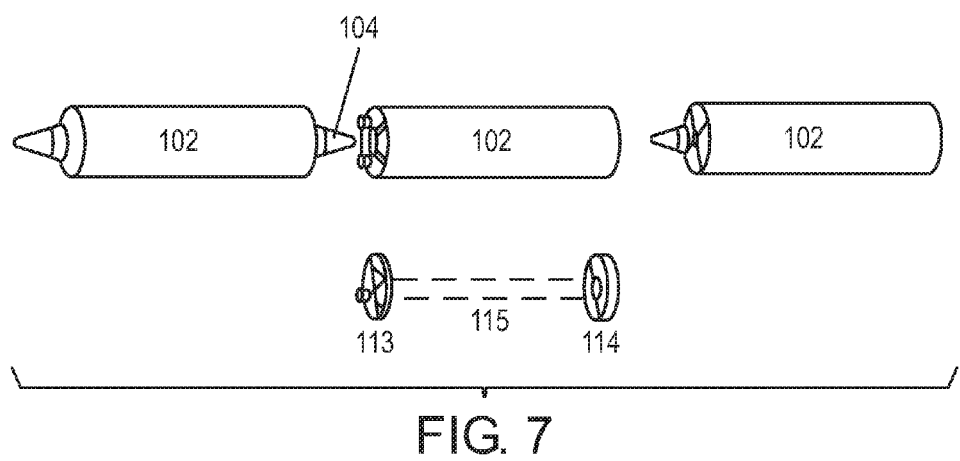
FIG. 7 presents exemplary rod-like modular furniture elements, which engage to each other by rotation movement.

FIG. 7 presents round shaped rod-like modular furniture elements in accordance with an exemplary embodiment, which engage to each other by a conic pivot 104, and fix to each other by combining and rotating the male 113 and female ends 114. Inside the casting isolated from one another, electrically conductive structures 115 operate both as fixing means and as a power conductor. By changing material of the conic pivot 104 can be provided a flexible feature to the attachment of the furniture.

Figure 8A:
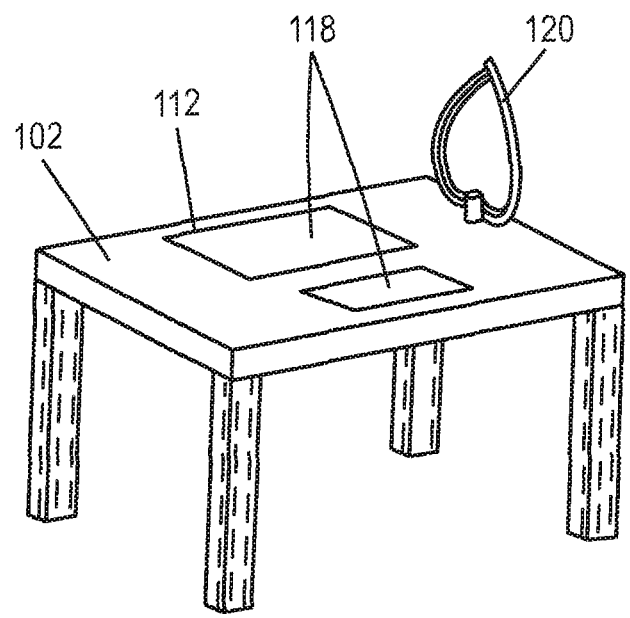
FIG. 8A presents a wireless desktop according to an exemplary embodiment, wherein the device components are turned into level of the desktop surface.

FIG. 8A presents a desktop formed of modular furniture elements 102 and application function modules 118, wherein the device components of the application function module can be turned into a level of the desktop surface.

Figure 8B:
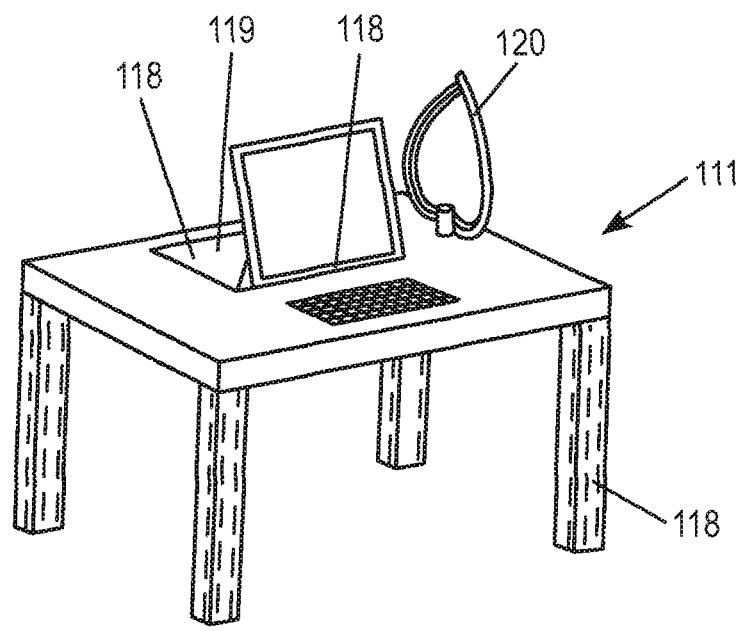
FIG. 8B presents a wireless desktop according to an exemplary embodiment, wherein the device components are turned up being ready for operation.

FIG. 8B presents a desktop formed of modular furniture elements 102 in which one modular furniture element 102 is changed to an application function module 118 which is a transformer and which is supplied with, for example, AC voltage, which is converted to DC voltage to the desired modular furniture elements 102 and other application function modules 118. The figure presents examples of application function modules or devices attached to the furniture modules. Application function modules 118 are powered from modular furniture elements 102, and controlled, for example, via a wireless connection. FIG. 8B presents a turning display and a keyboard at the desktop level, which are integrated as application function modules to the furniture, a frame part of which is attached to the electrical and mechanical attachment means of the furniture module, wherein an inside of the frame part includes electricity conductive structures, which lead electricity from the modular furniture element to the application function module. A storage compartment of the goods is made to the application function module. The lamp 120 presented in the figure is directly connected to the module furniture element, from which it gets its operating voltage.

Figure 9A:
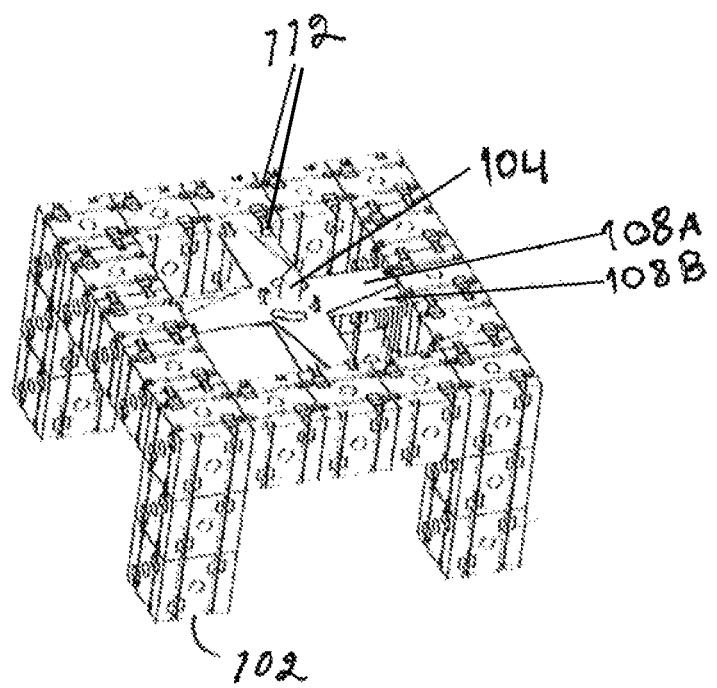
FIG. 9A presents an exemplary internal structure of a panel-like modular furniture part.

FIG. 9A presents an embodiment in which internal structures 108a and 108b of the panel-like modular furniture element 102 cast are structure parts, which are electrically conductive and isolated from each other, and which are arranged such that they form at least at two sides a conductive integrated mechanical structure. Furniture modules 102 can be duplicated in one or more directions to form a modular furniture entirety, and at least at one side an application function module can be attached to the modular furniture element.

Figure 9B:
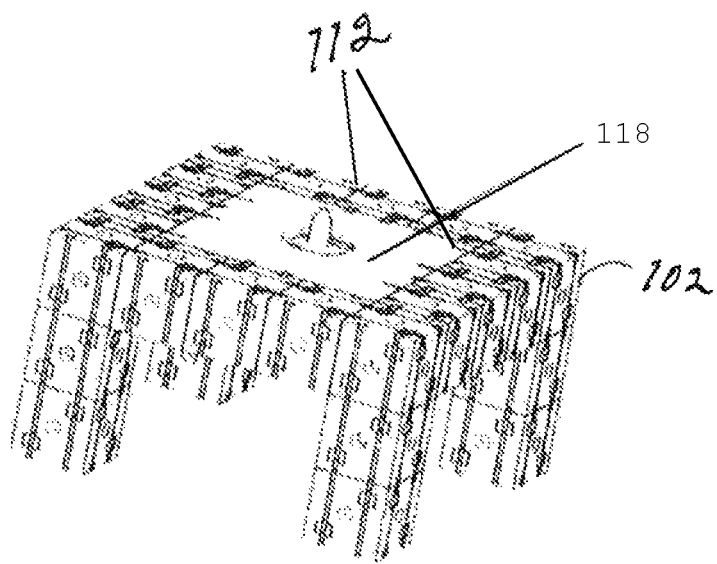
FIG. 9B presents an exemplary panel-like modular furniture element, which is fixed to a furniture structure, and an exemplary use function module or an actuator to a surface of the modular furniture element.

FIG. 9B presents modular furniture structure, in which to the center of a lid is fixed a panel-like modular furniture element 102, in which support structures 108 being electrically conductive and isolated from each other are isolated from each other within the casting.

Figure 10:
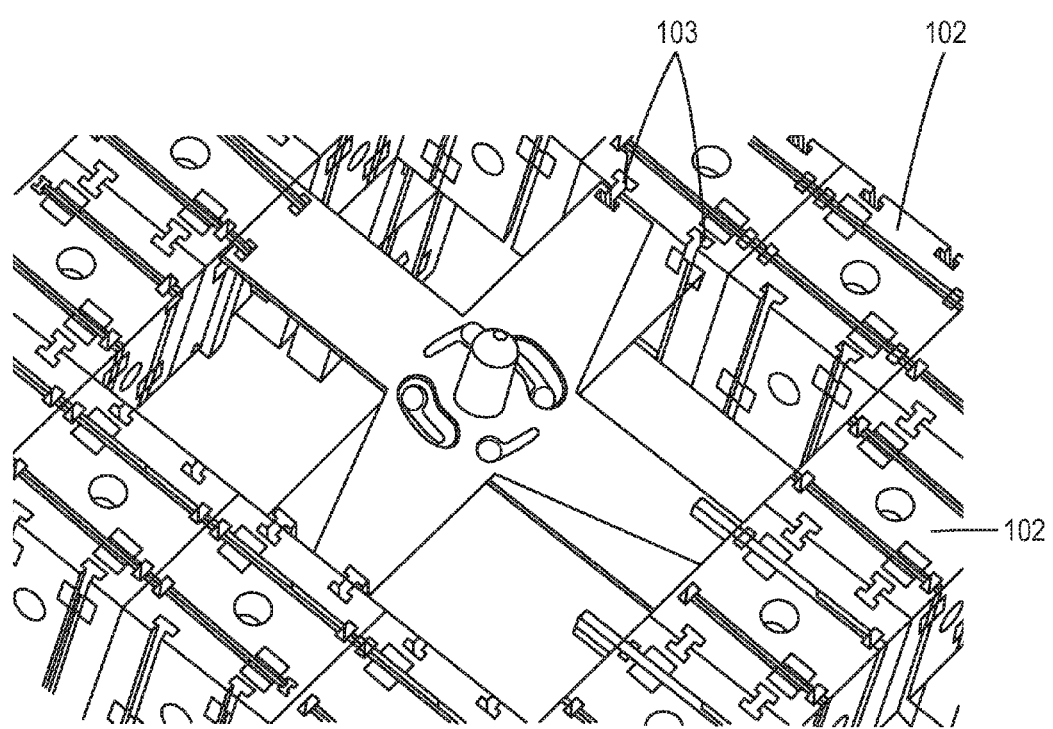
FIG. 10 presents an exemplary electrical and mechanical fixing of a panel-like module furniture element.

FIG. 10 presents attachment mechanisms in more detail of panel-like modular furniture elements presented in FIGS. 9A and 9B. The figure presents an embodiment in which the panel-like modular furniture element 102 is electrically and mechanically connected and positioned by means of sliding parts 103, which conduct operation voltage between modular furniture elements. This figure presents how to attach to modular furniture element 102, by rotation movement, for example a modular furniture element, an application function module or some actuator.

In panel embodiments presented in FIGS. 9A, 9B and 10 inside the structure is also provided isolated electrically conductive structures which operate partly as a fixing component and a conductive component. At the center of the panel is provided a mechanism which allows for fixing of an actuator through a surface of the surface material by positioning and rotation. A conical pin operates both to position to the correct positioning and to strengthen the fixing, and the pin is detachable. Mechanical and electrical structures appearing from four sides of the panel locate the panel to the furniture, after which the horizontal conductive slider locking parts are pushed through fixing groove of the modular furniture element into the same shaped groove of the panel, and then electricity is conducted between the modules. Also, vertically sliding locking parts can be attached to the modules to perform the same action, but vertically.

Figure 11A:
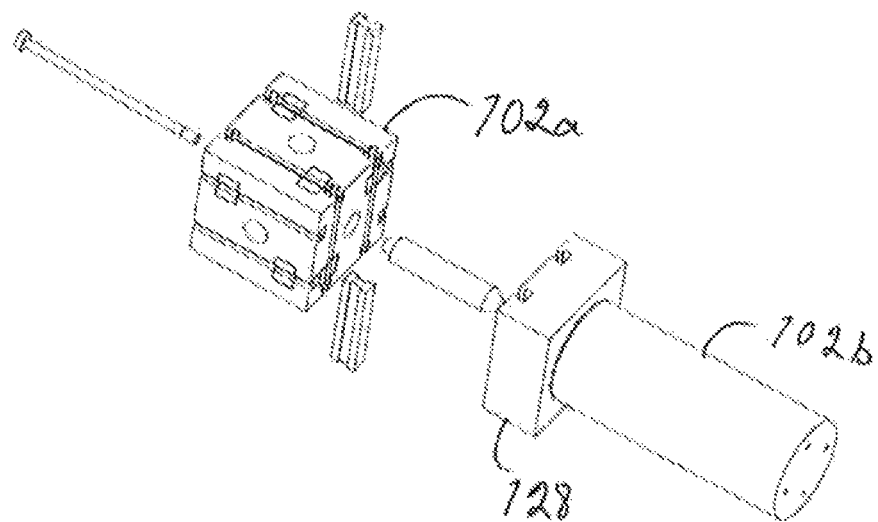
FIG. 11A presents entirety of two exemplary module furniture elements fixed through a spacer by a rotation movement in a so called exploded view.

FIG. 11A presents an entirety of two modular furniture elements 102a, 102b fixed to each other by using an attachment part 128, in which modular furniture part 102a is fixed via the sliding part 103 and modular furniture part 102 by rotation. Any size and shape of modular furniture elements can be fixed to each other by using the attachment part 128 presented in FIG. 11A. The attachment part 128 can be the form of, for example, circular or angular and it can operate as an attachment part between, for example, circular modular furniture 102b or it can be connected to an application function module 118, or some actuator 120.

Figure 11B:
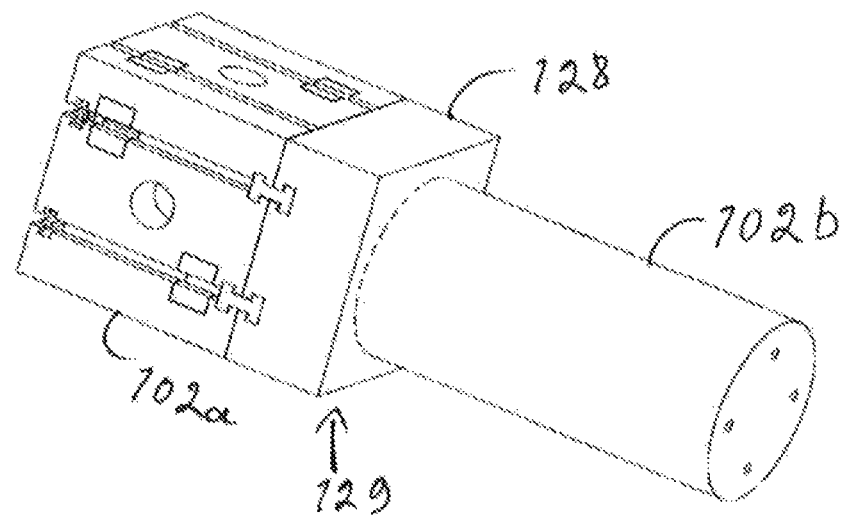
FIG. 11B presents the assembly of FIG. 11A in a completed assembly.

FIG. 11B presents a cast of the attachment part 129, which covers in FIG. 11A the internal structures of the attachment part and isolates them.

Figure 12:
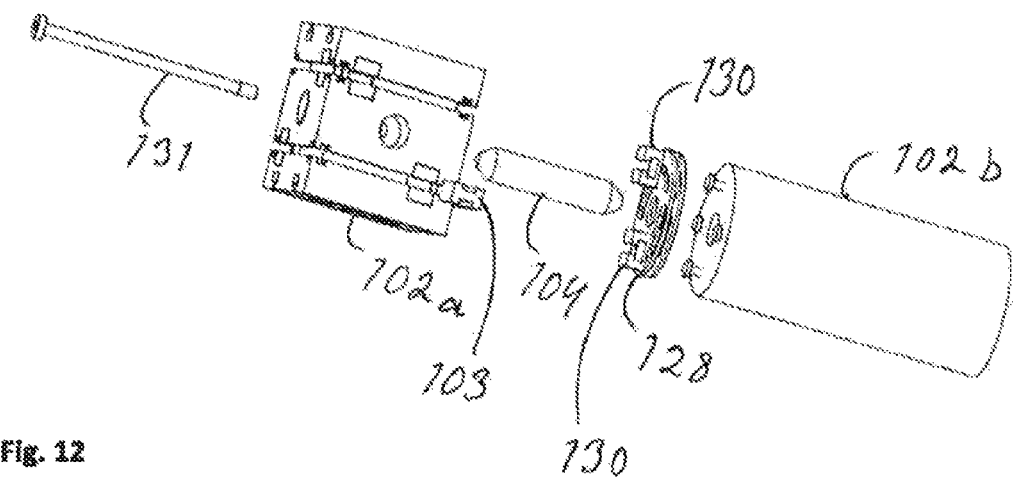
FIG. 12 presents an exemplary internal structure of the spacer presented in FIG. 11A-B.

FIG. 12 presents a second modular furniture element locking to a first modular furniture element via an attachment part 128 by rotation movement, which can be rod-like or angular. Two modular furniture elements are attached and positioned to each other by a conic pivot 104 and, by changing the material of the conic pivot, flexibility in the attachment point be changed. By using sliding parts 103 furniture modules 102 can be connected to each other both electrically and mechanically by means of the attachment part 128. Structure 130 of the attachment part includes (e.g., consists of) at least two different mutually isolated electrically conductive elements, around which there is provided a casting, which is to strengthen, and position to each other the modular furniture elements 102 to be fixed to each other, and the casting also isolates the electricity conductive mechanical structure parts 130 inside the casting from each other electrically. In an embodiment wherein it is desired to guarantee or to increase the bond strength a clamping screw 131 can be provided through any shaped modular furniture elements, to the base of which is formed an internal thread 132 for continuous fixing by screwing screw after screw. By the many screw fixings, the required stronger attachment can be obtained between module furniture elements, regardless of their size or shape.

Figure 13A:
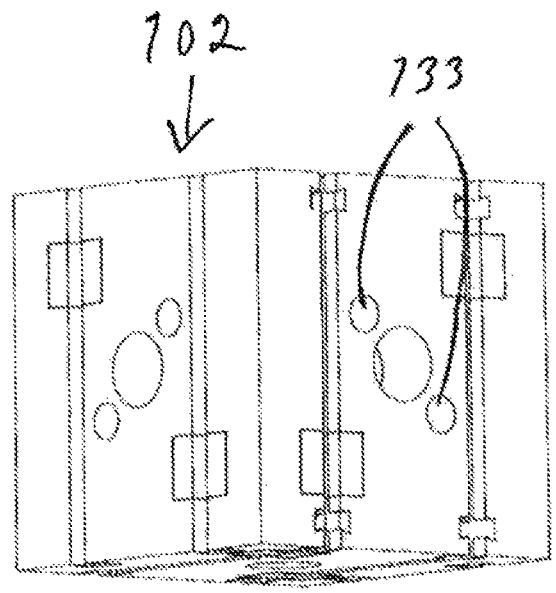
FIG. 13A presents at least one exemplary pressure-tolerant channel integrated into a structure of the module furniture part.

FIG. 13A presents at least one pressure-tolerant channel 133 integrated to structure of the modular furniture element 102, along which can be conveyed for example liquid, gas or air between at least two modular furniture elements.

Figure 13B:
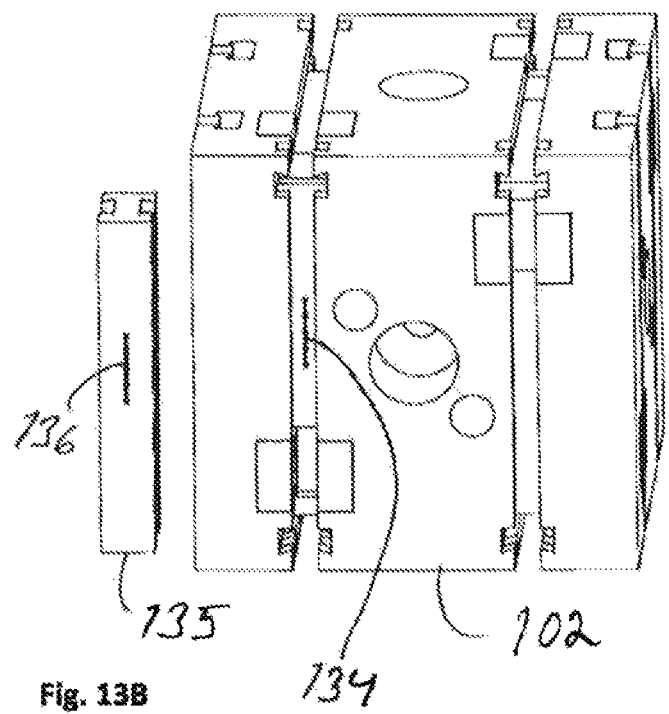
FIG. 13B presents an exemplary conductor component and an attachment part formed into a structure of the module furniture part or application function module, and a spacer into which is formed a conductor component.

FIG. 13B presents conductor means 134 located inside a casting of modular furniture, having at least two wires being isolated from each other, and the conductor means 134 conduct electricity through a sliding conductor part 135 between at least two modular furniture elements 102 or between a modular furniture element and the application function module. Inside a structure of the sliding conductor part 135 is formed conductor means 136 identical to the conductor means 134, through which electricity is conducted between the modular furniture elements, or to the application function module.

Figure 14:
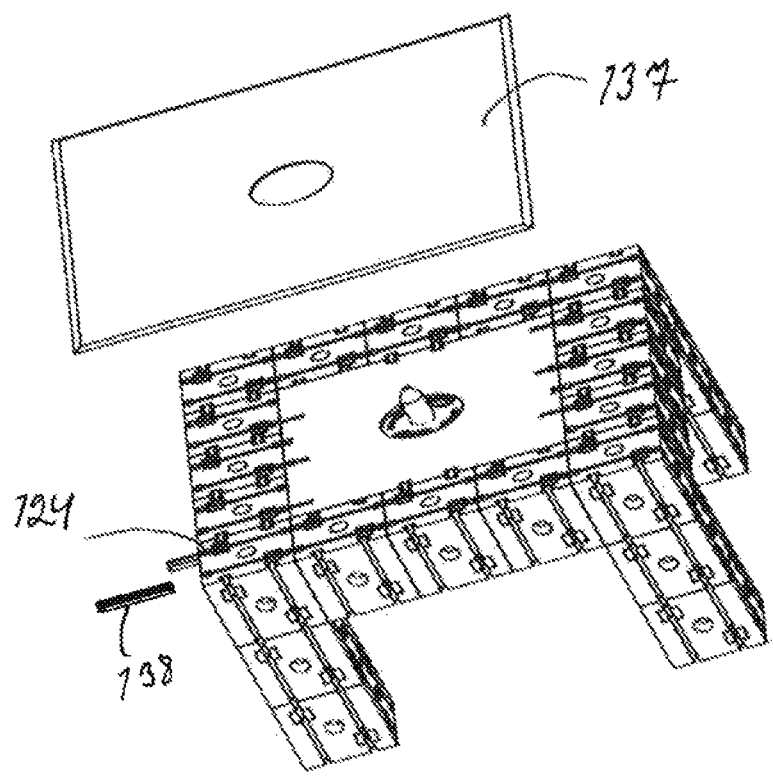
FIG. 14 presents an exemplary flexible, rollable, magnetically drawing surface material.

FIG. 14 presents a flexible, rollable, magnetically drawing surface material 137, which is kept stationary by magnetic sliding parts 138 which are inserted to the fixing groove 124 of the furniture module 102 or the application function module 118, wherein the sliding parts 138 are positioned and fixed on the basis of their forms.

Figure 15:
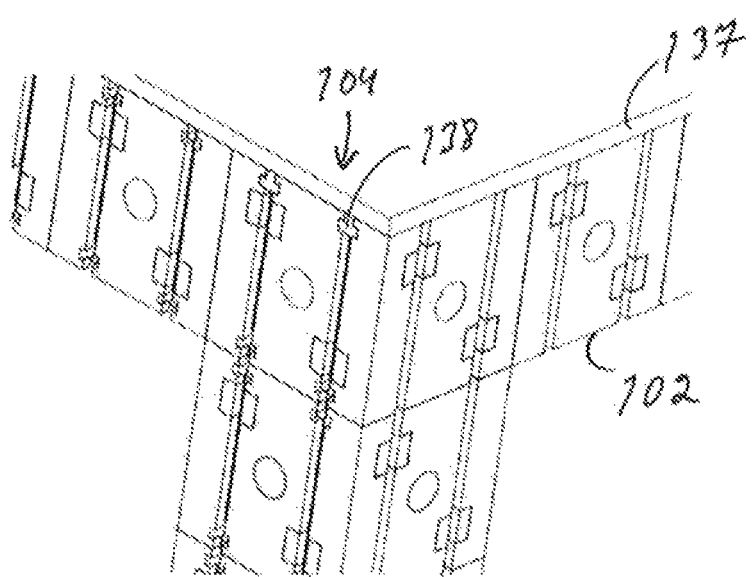
FIG. 15 presents an exemplary magnetic fixing of surface material by a magnetic slide part placed in a fixing groove of module furniture elements.

FIG. 15 presents fixing of the surface material 137 magnetically by magnetic sliding part 138 located in the groove 124 in the surface of the modular furniture elements 102.

Exemplary embodiments have been described with reference to the FIGS. 1-15. The modular furniture arrangement includes mechanically and electronically attachable modular furniture elements (102) and an application function module (118) attachable to the modular furniture elements, the application function module being chosen on the basis of the application. Inside the modular furniture elements and application function module is arranged at least two electricity conducting structures (108) being electrically isolated from each other, the structures (108) operating between modular furniture elements, and between modular furniture elements and at least one application function module both as mechanical fixing means and an electricity conductor. When the application function module 118 is fixed to at least one modular furniture element 102, an electrical connection 112 is formed between the modular furniture element (102) and the application function module (118) to conduct electricity between the modular furniture element (102) and the application function module (118). The electrical connection 112 is formed when the electricity conductive parts (i.e. conductors) of the modular furniture element (102) and the application function module (118) are attached in the fixing. The application function module can be for example the a device component such as for example the above mentioned computers, tablets, wireless charger, sound equipment, lightings and burglar alarms. The modular furniture arrangement can include at least one attachment part (103) for attaching modular furniture elements (102) to form furniture entireties of desired sizes. The attachment part can include at least one feature of material or material combination, which feature can be processed so that modular furniture elements (102) are attachable to each other by at least one of mechanical and electrical fixing method. For example, in an embodiment in which one attachment part 103 is used for attaching the module furniture elements to each other, to the attachment part is formed a material combination so that electricity conducting structures between modular furniture elements are not short-circuited, so the entire attachment part cannot be of electrically conductive material in this example. Material or material properties of the attachment part 103 are thus formed (e.g., processed according to different embodiments disclosed herein). Attachment part 103 is made of, for example, an electrically conductive material such as a metal or alloy material, which includes an electrically conductive material. An attachment part used only for mechanical attachment can also be of non-conductive material or material mixture.

In an exemplary embodiment the modular furniture arrangement can include means (111) for delivering information between modular furniture elements (102), and between modular furniture elements (102) and at least one application function module (118). At least one panel-like module furniture element (102), which is selected according to the application, can be attached to the modular furniture elements 102. Such embodiments are presented in FIGS. 9A, 9B and 10.

Magnetic fixings can be utilized to attach application function modules 118 or surface elements 137 to the application function modules 102, which are positioned to the table mechanically and are attached magnetically. Surface elements may be of different sizes and shapes, and made of the respective materials required for the intended use. The modular furniture arrangement can means (111) for changing an application of at least one application function module (118) by electrical control of the application function module. In the control electrical settings can be modified, for example, by the use of the keyboard (FIGS. 8A-B) of the application function module 118, by hand or by means 111 that convey information to the application function module via modular furniture parts 102, or with wireless control from user control apparatus, such as a smartphone, to the application function module 118.

In an exemplary embodiment, the modular furniture arrangement can include electricity conducting structures (108) and attachment parts (103) to attach modular furniture elements (102) to each other at six sides of them by forming both mechanical and electrical attachments, the structures (108) operating between modular furniture elements both as mechanical fixing means and as an electricity conductor. A furniture structure can thus be grown for example to six different directions so that modular furniture elements maintain their electrical network and a possibility to be duplicated. Respectively an application function module 118 can be attached to at least one modular furniture element 102.

In an exemplary embodiment, the modular furniture arrangement can include means for forming elasticity between attachments between module function elements (102). For example, by selecting material of the conic pivot presented in FIGS. 3A and 5 suitable to a selected application, or material of any other type of attachment part suitable to a selected application, a flexible feature can be formed to a hard and rigid furniture structure.

The modular furniture arrangement can include as at least one application function module a transformer (118) to transform a voltage level suitable to a selected application of the modular furniture arrangement. Below devices can remain storage lockers. For example, a transformer module located in the furniture leg can be fed for example by 230V AC voltage, which can be converted to DC voltage, for example, 19-48V.

In an exemplary embodiment, an interactive connection is accomplished between a human and a furniture structure, by which the modular furniture arrangement is able to detect the presence of a human by sensors measuring, for example, motion, heat and/or sound-measuring. In a furniture structure according to the disclosure, integrated measurement results can be measured by sensors of an intelligent measurement system in which by using software processor technology the measurement results of human presence can be interpreted in an interactive interfacing between the modular furniture arrangement, and human. As presence detection features programmable characteristics can be added, for example, burglar alarms, presence and/or access control. This feature may be able to identify human sex and size of the human being in the vicinity, and to store data resulting from interaction between a human and a furniture structure.

Next is presented examples of various applications according to the embodiments disclosed herein:

A) Modular furniture arrangements can be utilized in presentation furniture structures, for example at exhibitions. It is also possible to implement by using a stronger material, which is suitable to carry heavier objects. Its modularity does not limit use at different sizes of fair stands. The furniture is easy to dismantle to desired package sizes for shipment. In an exemplary embodiment, on the screen attached to the furniture at the stand a demo video can be played. The furniture can recognize when an interested customer has stopped in the vicinity. The furniture can initiate interaction with the customer. It is easy for the customer to give an interest in the matter without a pushy and time consuming salesman situation. It is for the customer to call the seller to come via the furniture or to effortlessly dictate his or her contact details to the furniture for future contact.

B) Multidimensional building platform enables interaction between human and the furniture to easily be achieved. Like in mobile games, an intelligence of a modular furniture structure according to the disclosure reaches interest of a person being in the vicinity. Sensors attached to the furniture detect the presence of human and thus awakens the furniture from the sleeping mode. The screen integrated to the furniture module makes easy and interesting questions and the person may not even notice that interactivity has already been created and the data collection started. In data collection, interaction with the machine is easier to achieve than interaction with a human. People avoid persons making surveys because it is never known how long will they take. With the furniture it is easy just to end the query when there is no interest, without a guilty conscience, or another person's dislike.

C) Office furniture in accordance with the modular furniture arrangement can make a big change in the offices with styles of new eras of solutions. Users can modify the furniture just as they want in size, shape and the related equipment. A wireless solution provides a completely new look to cleanliness and sanitation of offices. Location of devices installed in the furniture can be rather easily changed. Surface materials can be changed to bring a new look, without a need of new body of the furniture. As an example is presented CEO's office: CEO arrives in his office. The CEO sits down at a desk and sets the smartphone to the desk for an integrated platform which begins to wirelessly download the phone. Director dials the CEO's phone's security code, which awakens the computer system of the furniture and lighting to life and starts on a smart phone, a computer and a connection between human and them. CEO is able to manage devices of the entire office building from this desktop. Each workstation belonging to the staff is equipped with sensors attached to the furniture, which allows that the presence is easy to follow. Access control is facilitated. The system can be set to an alarm mode that detects and alarms movements in a forbidden period. Displays and keyboards can be turned on a level of the table in which the level surface is integral with the other levels, until they are turned out again, and underneath them can be found for example, storage lockers.

D) In training purposes, integrated devices of the modular furniture structures are fixed to the furniture and they cannot be moved. The devices are electrically safe, because to the furniture network is not supplied with the AC voltage 230V. Cleanliness and performance of the teaching room will be significantly improved without wires. The student can without disturbing others ask questions to the teacher, wirelessly. This system allows for monitoring of students' physical education work in real time as well as for saving in real time. In special education use, the furniture is capable of guiding and rewarding, for example, restless students, as well as to form an interesting learning situation like a mobile game.

E) Modular furniture arrangement reduces and enhances work tasks of restaurant staff and, therefore, more time is provided for serving customers. The customer enters the restaurant and carries out his or her orders with a display device integrated to the furniture. With ordering and paying, the furniture can include amusements for the little ones as well as provide easy possibility for adults to give customer feedback. Wireless solutions are easier to be kept clean.

In night clubs modular furniture structures can also act as a substitute for the order waitresses. Various LED installed lighting components can live with the music in rhythm, without wires.

F) Modular furniture arrangement allows for a wireless bed for the children to which can be wirelessly connected and controlled application function modules or actuators that can be, for example, a display, a speaker, a baby monitor, a heart sensor, a camera, for example, at home or in hospitals. For hospital use, parents can easily follow children in mobile mode and form a visual voice connection via the furniture.

In embodiments disclosed herein, control of a modular furniture arrangement can be accomplished via a wire communication connection or via wireless data communication arrangement, for example, a mobile device such as a smart phone. In one embodiment of the present invention can be incorporated between the surface material of the material furniture arrangement unobtrusive conductor lines. Such data transmission along the sides of the modular as a smart phone. In one embodiment of the present invention can be incorporated between the surface material of the material furniture arrangement unobtrusive conductor lines. Such data transmission along the sides of the modular furniture arrangement can be utilized e.g. in environments, where wireless data communication may be associated uncertainties.

Exemplary embodiments can be carried out with a table height adjustment completely wirelessly.

In embodiments disclosed herein, flat, shaped, supply cable fixing to the floor, can be used which cable is unobtrusive and does not cause difficulties, for example, to cleaning work as well and cannot be tripped over. The cable can be used to feed into the furniture operating voltage of, for example, 110-230 ACV.

Although exemplary embodiments have been described herein with reference to the present description and figures, the invention is not limited to the description and figures but can be modified within the scope of the attached claims. Embodiments according to the invention can be utilized also in building structures such as in wall structures or in wall-like structures.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A modular furniture arrangement, comprising:
    module furniture elements attachable at least at three sides mechanically and electronically;
    an application function module attachable to the modular furniture elements, the application function module being chosen based on an application, wherein inside the modular furniture elements and application function module is arranged, at least two electricity conducting structures electrically isolated from each other, said structures operating between modular furniture elements and between modular furniture elements and at least one application function module serving both for mechanical fixing means and as an electricity conductor;
    at least one attachment part for attaching modular furniture elements to form furniture entireties of desired sizes, which attachment part includes at least one feature of material or material combination, which feature can be processed so that modular furniture elements are attachable to each other by a mechanical and electrical fixing; and
    electrical connections between the modular furniture elements and the application function module to conduct electricity between the modular furniture element and the application function module.

2. Modular furniture arrangement according to the claim 1, comprising:
    means for delivering information between modular furniture elements, and between modular furniture elements and at least one application function module.

3. Modular furniture arrangement according to the claim 2, comprising:
    means for delivering information between modular furniture elements, and between application function module and a smart device.

4. Modular furniture arrangement according to the claim 1, comprising:
    means for changing the application of at least one application function module by electrical control of the application function module.

5. Modular furniture arrangement according to the claim 1, comprising:
    three or more electricity conducting structures electrically isolated from each other, said structures operating between modular furniture elements and between modular furniture elements, and at least one application function module for mechanical fixing and serving as an electricity conductor.

6. Modular furniture arrangement according to the claim 1, comprising:
    at least one panel-like module furniture element which is selected according to the application.

7. Modular furniture arrangement according to the claim 1, comprising:
    electricity conducting structures and attachment parts to attach modular furniture elements to each other at six sides of them, said structures operating between modular furniture elements for mechanical fixing and serving as an electricity conductor.

8. Modular furniture arrangement according to the claim 1, comprising:
    means for forming elasticity between attachments between modular furniture elements.

9. Modular furniture arrangement according to the claim 1, comprising:
as at least one application function module, a transformer to transform a voltage level suitable to a selected application of the modular furniture arrangement.

10. A method to form modular furniture entireties, comprising:
connecting modular furniture elements having at least three mechanically and electronically attaching sides, and an application function module, the application function module being chosen based on an application, wherein inside the modular furniture elements and application function module is arranged, at least two electricity conducting structures electrically isolated from each other, said structures operating between modular furniture elements and between modular furniture elements and at least one application function module both as for mechanical fixing and serving as an electricity conductor; and
attaching the modular furniture elements to form furniture entireties of desired sizes, wherein by changing at least one feature of material or material combination of an attachment part modular furniture elements are attached to each other by mechanical and electrical fixing, whereby an electrical connection between a modular furniture element and the application function module is configured to conduct electricity between the modular furniture element and the application function module.

11. A modular building element arrangement, comprising:
modular panel-like building elements attachable at least at three sides mechanically and electronically to other modular panel-like building elements;
at least two electricity conducting structures electrically isolated from each other arranged inside the modular panel-like building elements, said structures operating between modular panel-like building elements and serving both as mechanical fixing means and as an electricity conductor;
at least one attachment part for attaching modular panel-like building elements to form building structures of desired sizes, which attachment part includes at least one feature of material or material combination, which feature can be processed so that modular panel-like building elements are attachable to each other by a mechanical and electrical fixing; and
electrical connections between the modular panel-like building elements to conduct electricity between the modular panel-like building elements.

12. A modular building element arrangement according to claim 11, wherein the modular panel-like building elements are attached to each other to form a wall structure.

* * * * *